(12) United States Patent
Kuwata et al.

(10) Patent No.: US 6,392,759 B1
(45) Date of Patent: May 21, 2002

(54) EDGE-ENHANCEMENT PROCESSING APPARATUS AND METHOD, AND MEDIUM CONTAINING EDGE-ENHANCEMENT PROCESSING PROGRAM

(75) Inventors: Naoki Kuwata; Yoshihiro Nakami, both of Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/085,111

(22) Filed: May 28, 1998

(30) Foreign Application Priority Data

Jun. 2, 1997 (JP) .............................................. 9-144059

(51) Int. Cl.[7] .............................................. G06F 13/00
(52) U.S. Cl. ........................ 358/1.9; 358/448; 382/199; 382/266
(58) Field of Search ............................. 358/1.2, 1.5, 1.9, 358/448, 452, 456, 458; 382/199, 256, 266, 267, 269, 270, 274

(56) References Cited

U.S. PATENT DOCUMENTS 5,271,064 A 12/1993 Dhawan et al. ................ 382/54
5,513,016 A 4/1996 Inoue ........................... 358/456
6,075,926 A * 6/2000 Atkins et al. ................. 358/1.2

FOREIGN PATENT DOCUMENTS

JP 6-68252 3/1994 ........... G06F/15/68

\* cited by examiner

*Primary Examiner*—Mark Wallerson
(74) *Attorney, Agent, or Firm*—Sughrue Mion, PLLC

(57) ABSTRACT

An edge-enhancement processing apparatus which removes problems of the conventional edge enhancement processing, which requires checking by an operator's visual observation or a high-frequency band filter, thus complicating the construction. A computer main body 21, as the nucleus of edge enhancement processing, calculates an edge amount as change level while generating a vector based on the difference values of data between adjacent pixels, at step S110, then selects and integrates edge amounts of only pixels having large edge amounts at steps S120 and S130, and obtains the mean value at step S230, to obtain the sharpness level of the image while adding attention to the pixels having large image change levels. The computer main body 21 determines an edge enhancement level Eenhance based on the image sharpness level. Thus, the computer main body 21 automatically performs edge enhancement processing at an optimum enhancement level.

13 Claims, 16 Drawing Sheets

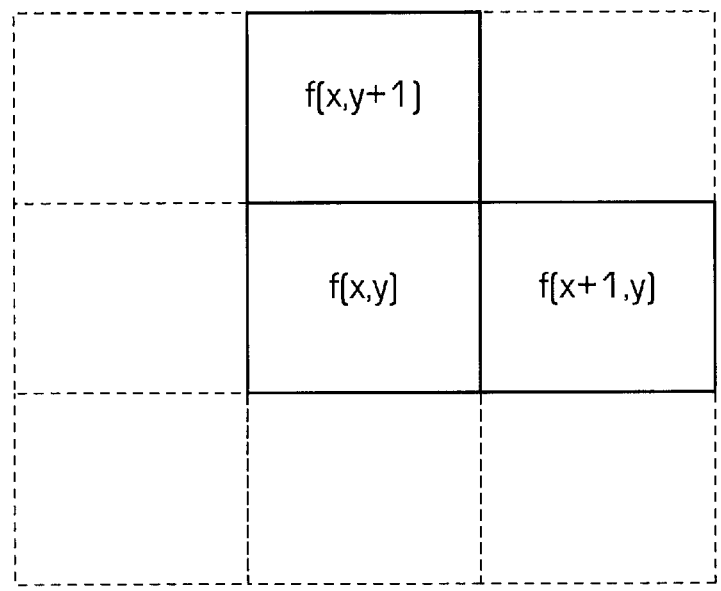

|  | i=-2 | -1 | 0 | 1 | 2 |
|---|---|---|---|---|---|
| j=-2 | 0 | 2 | 4 | 2 | 0 |
| -1 | 2 | 20 | 46 | 20 | 2 |
| 0 | 4 | 46 | 100 | 46 | 4 |
| 1 | 2 | 20 | 46 | 20 | 2 |
| 2 | 0 | 2 | 4 | 2 | 0 |

| j=-3 | -2 | -1 | 0 | 1 | 2 | 3 | i |
|---|---|---|---|---|---|---|---|
| 0 | 0 | 1 | 1 | 1 | 0 | 0 | 3 |
| 0 | 2 | 8 | 14 | 8 | 2 | 0 | 2 |
| 1 | 8 | 37 | 61 | 37 | 8 | 1 | 1 |
| 1 | 14 | 61 | 100 | 61 | 14 | 1 | 0 |
| 1 | 8 | 37 | 61 | 37 | 8 | 1 | -1 |
| 0 | 2 | 8 | 14 | 8 | 2 | 0 | -2 |
| 0 | 0 | 1 | 1 | 1 | 0 | 0 | i=-3 |

| | i=-6 | -5 | -4 | -3 | -2 | -1 | 0 | 1 | 2 | 3 | 4 | 5 | 6 |
|---|---|---|---|---|---|---|---|---|---|---|---|---|---|
| j=-6 | 0 | 0 | 0 | 0 | 1 | 1 | 1 | 1 | 1 | 0 | 0 | 0 | 0 |
| -5 | 0 | 0 | 1 | 1 | 3 | 4 | 4 | 4 | 3 | 1 | 1 | 0 | 0 |
| -4 | 0 | 1 | 2 | 4 | 8 | 12 | 14 | 12 | 8 | 4 | 2 | 1 | 0 |
| -3 | 0 | 1 | 4 | 11 | 20 | 29 | 32 | 29 | 20 | 11 | 4 | 1 | 0 |
| -2 | 1 | 3 | 8 | 20 | 37 | 54 | 61 | 54 | 37 | 20 | 8 | 3 | 1 |
| -1 | 1 | 4 | 12 | 29 | 54 | 78 | 88 | 78 | 54 | 29 | 12 | 4 | 1 |
| 0 | 1 | 4 | 14 | 32 | 61 | 88 | 100 | 88 | 61 | 32 | 14 | 4 | 1 |
| 1 | 1 | 4 | 12 | 29 | 54 | 78 | 88 | 78 | 54 | 29 | 12 | 4 | 1 |
| 2 | 1 | 3 | 8 | 20 | 37 | 54 | 61 | 54 | 37 | 20 | 8 | 3 | 1 |
| 3 | 0 | 1 | 4 | 11 | 20 | 29 | 32 | 29 | 20 | 11 | 4 | 1 | 0 |
| 4 | 0 | 1 | 2 | 4 | 8 | 12 | 14 | 12 | 8 | 4 | 2 | 1 | 0 |
| 5 | 0 | 0 | 1 | 1 | 3 | 4 | 4 | 4 | 3 | 1 | 1 | 0 | 0 |
| 6 | 0 | 0 | 0 | 0 | 1 | 1 | 1 | 1 | 1 | 0 | 0 | 0 | 0 |

43

2516

EDGE-ENHANCEMENT PROCESSING APPARATUS AND METHOD, AND MEDIUM CONTAINING EDGE-ENHANCEMENT PROCESSING PROGRAM

BACKGROUND OF THE INVENTION

1. Field of the Invention

The present invention relates to an edge-enhancement processing apparatus and method for performing edge enhancement processing based on multi-level image data representing an image with pixels in dot matrix, and a medium containing an edge-enhancement processing program.

2. Description of the Prior Art

Conventionally, image-processing software programs for performing edge enhancement processing to enhance edge portions on image data representing a photograph or the like are known. These programs read image data into a computer, convert the image data at different edge enhancement levels by trial and error. An operator checks the converted result on a display screen by visual observation, thus adjusting it to have appropriately enhanced edge portions.

Japanese Patent Application Laid-Open No. 6-68252 discloses obtaining high frequency components in edge areas of an image by using a high-frequency band filter, judging the sharpness of the image based on the mean value of the high frequency components and controlling an edge enhancement parameter.

In the former case, since the converted result must be checked by the operator's visual observation, an appropriate enhancing level cannot be automatically set.

In the latter case, since the high frequency components are obtained by using the high-frequency band filter, the processing is complicated.

SUMMARY OF THE INVENTION

Accordingly, an object of the present invention is to provide an edge-enhancement processing apparatus and method capable of judging the sharpness of an image with simpler method and automatically performing optimum edge enhancement processing.

The edge-enhancement processing apparatus provided by the present invention is an edge-enhancement processing apparatus comprising: image-data obtaining unit which obtains multi-level image data representing an image with pixels in dot matrix; summation processing unit which calculates a change level of each pixel based on differences of luminance or substitute values for luminance between the pixel and peripheral pixels, as a vector value, and sums up vector values of pixels having large vector values; edge-enhancement element determination unit which determines an edge enhancement element while judging a sharpness level of the image based on the result of summation; and edge-enhancement unit which performs edge enhancement processing on respective edge pixels based on the determined edge enhancement element.

In the present invention having the above construction, when the image-data obtaining unit obtains multi-level image data representing an image with pixels in dot matrix, the summation processing unit calculates a change level of each pixel based on differences of luminance or substitute values for luminance between the pixel and peripheral pixels, as a vector value, and sums up vector values of pixels having large vector values. On the other hand, the edge-enhancement element determination unit determines an edge enhancement element while judging the sharpness level of the image based on the result of summation. The edge enhancement unit performs edge enhancement processing on respective edge pixels based on the determined edge enhancement element.

That is, upon calculating the sharpness level of the image from change levels of respective pixels on the premise that the enhancement level is not necessarily greatly raised if the image is sharp, the change level of each pixel is calculated based on the differences of luminance or substitute values for luminance between the pixel and peripheral pixels, as a vector value. The image change levels are obtained in pixel units on the premise that the image data is composed of pixels in dot matrix.

On the other hand, assuming that an object to be imagesensed is called a subject and the area other than the subject is called a background, the operator considers edge enhancement processing only based on the sharpness level of the subject and takes little account of the background. In this case, the subject is usually sharper than the background. Accordingly, when the sharpness level of the image is judged based on the result of summation with respect to pixels having large change level, the judgment is made on the same condition as that for judgment with respect to the subject.

According to the present invention, as a vector value is calculated based on the differences of luminance or substitue values for luminance between each pixel and peripheral pixels, to determine the edge enhancement element, an edge-enhancement processing apparatus which automatically performs edge enhancement processing can be provided with a simple construction.

As described above, when calculating the sharpness level of the image from change levels of respective pixels, the calculation of a vector value based on the differences of luminance or substitute values for luminance between each pixel and peripheral pixels are not necessarily realized by a hardware apparatus, but may be realized as a method for the apparatus. Accordingly, the present invention provides an edge-enhancement processing method for performing edge enhancement processing on multi-level image data representing an image with pixels in dot matrix, comprising: a step of calculating a change level of each pixel based on differences of luminance or substitute values for luminance between the pixel and peripheral pixels, as a vector value, and summing up vector values of pixels having large vector values; a step of determining an edge enhancement element while a judging sharpness level of the image based on the result of summation, while; and a step of performing edge enhancement processing on respective edge pixels based on the determined edge enhancement element.

That is, the edge enhancement processing is effective not only when embodied with a hardware apparatus but when embodied as a method for the apparatus.

The summation processing unit calculates a change level of each pixel based on differences of luminance or substitute values for luminance between the pixel and peripheral pixels, as a vector value. If the image data has pixel data in dot matrix arranged in vertical and lateral directions, there are eight adjacent pixels around a pixel of interest. However, in evaluation, comparison may not be necessarily made with all these adjacent pixels.

Accordingly, another object of the present invention is to provide an example of the summation processing unit. To attain the object, in the edge-enhancement processing apparatus provided by the present invention, when the summation processing unit calculates a change level of each pixel based on differences of luminance or substitute values for luminance between the pixel and peripheral pixels, as a vector value, employs the differences of luminance or substitute values for luminance among a plurality of pixels which are not arrayed in a linear direction.

According to the present invention having the above construction, as the vector is generated based on the differences of luminance or substitute values for luminance among a plurality of pixels which are not arrayed in a linear direction, the number of pixels taken into consideration upon vector generation is the half of that in the previous construction. That is, in case of pixels adjacent to each other, the vector elements arrayed in a linear direction interact with each other, therefore, evaluation on these pixels may be omitted without significant influence.

In this manner, according to the present invention, the vectors can be obtained in pixel units with small amount of calculation processing.

Further, as the summation processing unit to sum up the change levels of the pixels to judge the sharpness level of the image, various types of processing units may be employed.

Further, another object of the present invention is to provide an example of the summation processing unit.

In the edge-enhancement processing apparatus provided by the present invention, said summation processing unit performs the summation such that as the vector value increases, a weight increases.

In the present invention having the above construction, when the summation processing unit sums up the change level, the weight is increased as the change level increases. The summation includes reducing the weight as the change level decreases. In any case, the sharpness level of the image is judged while making much account on a sharp portion such as a subject.

Further, the result of summation is not limited to a specific value, but may be a mean value or a median as long as it is a central value in statistical meaning.

In this manner, according to the present invention, the influence levels of pixels are controlled by changing the weight, and an optimum edge enhancement element can be determined.

Further, in this example, the summation is performed on pixels having substantially large change levels by changing the weight, however, it is not limited to this arrangement.

Further, another object of the present invention is to provide an example of summation on pixels having substantially large change levels.

In the edge-enhancement processing apparatus provided by the present invention, said summation processing unit performs summation on outline pixels having large change level.

In the present invention having the above construction, the summation processing unit sums up the change levels of pixels having large vector values. That is, the summation is performed only on outline pixels, making no account on pixels other than the outline pixels, and the sharpness level of the image is judged based on the result of summation. Accordingly, an image portion with low sharpness level such as a background is not taken into consideration in image sharpness level judgment unless it is determined as an outline portion.

In this manner, according to the present invention, as the sharpness level of the image is judged only at outline portions having large image change level, an optimum edge enhancement level can be set without influence by the size of the background or the like.

The edge enhancement element is not limited to the enhancement level, but it includes various control conditions for enhancement processing.

Further, another object of the present invention is to provide an example of control condition for enhancement processing.

In the edge-enhancement processing apparatus provided by the present invention, said edge-enhancement element determination unit determines an enhanced-pixel selection condition so as to perform edge enhancement processing only on pixels having vector values higher than a predetermined threshold value, based on the result of summation.

In the present invention having the above construction, the edge-enhancement element determination unit determines the enhanced-pixel selection condition based on the result of summation so as to perform enhancement processing only on pixels having vector values higher than the predetermined threshold value. That is, enhancement processing is performed only on pixels having change levels higher than the predetermined threshold value, apart from the enhancement level, which avoids enhancement on a portion which is not an edge portion.

In this manner, according to the present invention, image quality can be improved by avoiding enhancement processing on non-edge portions.

When the threshold value is set based on the result of summation, the threshold value is set so as not to perform edge enhancement processing on non-edge pixels. More specifically, various references can be employed in the threshold setting.

Further, another object of the present invention is to provide a specific threshold-value setting method.

In the edge-enhancement processing apparatus provided by the present invention, said edge-enhancement element determination unit determines the threshold value based on the ratio of the pixels having the large vector values.

In the present invention having the above construction, when setting the enhanced-pixel selection condition, the edge-enhancement element determination unit obtains the ratio of pixels having large vector values and determines the threshold value based on the ratio. That is, if the number of pixels having large change levels is large in the entire image, the threshold value is lowered so as to perform enhancement on many pixels. If the number of pixels having large change levels is small in the entire image, the threshold value is raised so as not to easily perform enhancement on non-edge pixels.

In this manner, according to the present invention, as the threshold value is set based on the ratio of pixels having large change levels in the entire image, if the entire image is sharp, the threshold value is lowered so as to perform edge enhancement processing on more pixels, to improve the image quality, while if the entire image is unsharp, the threshold value is raised so as not to easily perform edge enhancement processing, to avoid edge enhancement processing on non-edge pixels.

The enhancement level may be determined not only based on the vector values as described above, but based on other factors.

Accordingly, another object of the present invention is to provide an edge-enhancement processing apparatus in consideration of the other factors.

In the edge-enhancement processing apparatus provided by the present invention, said edge-enhancement element determination unit detects an image size of the image, and determines the edge enhancement element such that as the image size increases, the edge enhancement level increases.

In the present invention having the above construction, when the edge-enhancement element determination unit determines the edge enhancement element, the unit detects the image size of the image data, and sets the edge enhancement element such that as the image size increases, the enhancement level increases. When an operator tries to recognize an image or the like, if the image is large, the operator tends to see the image from apart Accordingly, in such case, the enhancement level must be raised so that the large image has the same visual effect of equal value as the small one.

In this manner, according to the present invention, a further optimum edge enhancement level can be set by using the image size, corresponding to effect of edge enhancement processing, as a reference for edge-enhancement element determination.

On the other hand, the edge enhancement processing itself performed by the edge enhancement unit may be any processing as long as it is performed based on the determined enhancement element, and its concrete method is not limited to a specific method.

Accordingly, another object of the present invention is to provide a more specific example of edge enhancement processing.

In the edge-enhancement processing apparatus provided by the present invention, said edge enhancement unit has unsharp masks of different sizes, and selects one of the unsharp masks in correspondence with different edge enhancement levels.

In the present invention having the above construction, as the unsharp masks of different sizes are provided, enhancement is performed by selecting one of the unsharp masks, in correspondence with the different edge enhancement levels. As the unsharp mask is greater, more peripheral pixels are processed, which blurs the image. However, in the edge enhancement processing, the unsharp components are subtracted, which reinforces the edge enhancement processing.

In this manner, according to the present invention, the edge enhancement level can be controlled comparatively easily by changing the size of the unsharp mask.

The edge-enhancement processing apparatus may be a single apparatus or installed into another apparatus. Thus, the concept of the invention is not limited to the above edge-enhancement processing apparatus but includes various aspects. Accordingly, the present invention may be appropriately modified. For example, the present invention may be embodied with software or hardware construction.

In a case where the concept of the present invention is embodied as a software program for an edge-enhancement processing apparatus, the present invention is utilized as the software program recorded in a recording medium.

Further, another object of the present invention is to provide a recording medium in which the software is recorded.

The medium containing an edge-enhancement processing program provided by the present invention is a medium containing an edge-enhancement processing program for performing edge enhancement processing by a computer on multi-level image data representing an image with pixels in dot matrix, said program including: a step of calculating a change level of each pixel based on differences of luminance or substitute values for luminance between the pixel and peripheral pixels, as a vector value, and summing up the vector values; a step of determining an edge enhancement element while judging a sharpness level of the image based on the result of summation; and a step of performing edge enhancement processing on respective edge pixels based on the determined edge enhancement element.

The recording medium may be a magnetic recording medium or an magneto-optical recording medium, or further, any recording medium to be developed in the future. Furthermore, the recording medium may be a duplicated product such as a primary duplicated product or a secondary duplicated product. Further, the present invention can be utilized by providing the present invention via a communication line, or using the present invention written in a semiconductor chip or the like.

Further, even if the present invention is embodied partially with a software construction and partially with a hardware construction, the concept of the present invention is not different at all, further, it may be arranged such that a part of the present invention is stored on a recording medium and appropriately read in accordance with necessity.

In this manner, according to the present invention, a medium where the edge-enhancement processing program is recorded can be provided.

In the point that image quality is improved by increasing the edge enhancement level as the image becomes greater, the sharpness level of the image should not be necessarily calculated from change levels of respective pixels.

Accordingly, further object of the present invention is to provide an edge-enhancement processing apparatus and method capable of performing optimum edge enhancement processing in accordance with the size of an image.

The edge-enhancement processing apparatus provided by the present invention is an edge-enhancement processing apparatus comprising: image-data obtaining unit which obtains multi-level image data representing an image with pixels in dot matrix; edge-enhancement level obtaining unit which obtains an edge enhancement level; edge-enhancement level correction unit which detects an image size of the image data, and corrects the edge enhancement level such that as the image size increases, the edge enhancement level increases; and edge enhancement unit for corrected enhancement level which performs edge enhancement processing on respective edge pixels based on the corrected edge enhancement level.

In the present invention having the above construction, the edge-enhancement level obtaining unit obtains the edge enhancement level, and for edge enhancement on respective edge pixels based on the edge enhancement level, the edge-enhancement level correction unit detects the size of the image, and corrects the enhancement level such that as the image size increases, the edge enhancement level increases, and the edge enhancement unit for corrected enhancement level performs edge enhancement on respective edge pixels based on the corrected edge enhancement level.

According to the present invention, as the size of the image corresponding to the effect of edge enhancement processing is also used as a reference for edge-enhancement level setting, a more optimum enhancement level of edge enhancement processing can be set.

It will be easily understood that the correction on the enhancement level in accordance with the size of the image should not be necessarily realized by a hardware apparatus, but it may be realized as a method for the apparatus.

Accordingly, the edge-enhancement processing method provided by the present invention is an edge-enhancement processing method for performing edge enhancement processing on multi-level image data representing an image with pixels in dot matrix, comprising: a step of obtaining multi-level image data representing an image with pixels in dot matrix; a step of obtaining an edge enhancement level; a step of detecting an image size of the image data, and correcting the edge enhancement level such that as the image size increases, the edge-enhancement level increases; and a step of performing edge enhancement processing on respective edge pixels based on the corrected edge enhancement level.

That is, the preset invention is effective not only when embodied with a hardware apparatus but when embodied as a method for the apparatus.

In this case, the concept of the present invention is not limited to the method, but it includes various aspects. For example, the present invention is realized in the form of a software program.

In a case where the concept of the present invention is embodied as a software program for an edge-enhancement processing apparatus, the present invention is utilized as the software program recorded in a recording medium.

Further, another object of the present invention is to provide a recording medium in which the software is recorded.

The medium containing an edge-enhancement processing program provided by the present invention is a medium containing an edge-enhancement processing program for performing edge enhancement processing by a computer on multi-level image data representing an image with pixels in dot matrix, said program including: a step of obtaining multi-level image data representing an image with pixels in dot matrix; a step of obtaining an edge enhancement level; a step of detecting an image size of the image data, and correcting the edge enhancement level such that as the image size increases, the edge enhancement level increases; and a step of performing edge enhancement processing on respective edge pixels based on the corrected edge enhancement level.

As described above, according to the present invention, a medium containing a program for performing the above edge-enhancement processing can be provided.

BRIEF DESCRIPTION OF THE DRAWINGS

FIG. 9 is an explanatory view showing a case where the image change level is obtained from difference values between adjacent pixels in a vertical-axial direction and a lateral-axial direction;

FIG. 10 is an explanatory view showing a case where the image change level is obtained from difference values between adjacent pixels in all directions;

FIG. 18 is a table showing a minimum-sized unsharp mask;

FIG. 19 is a table showing a middle-sized unsharp mask;

FIG. 20 is a table showing a maximum-sized unsharp mask; and

DETAILED DESCRIPTION OF THE PREFERRED EMBODIMENT

Preferred embodiment of the present invention will now be described in detail in accordance with the accompanying drawings.

Figure 1:
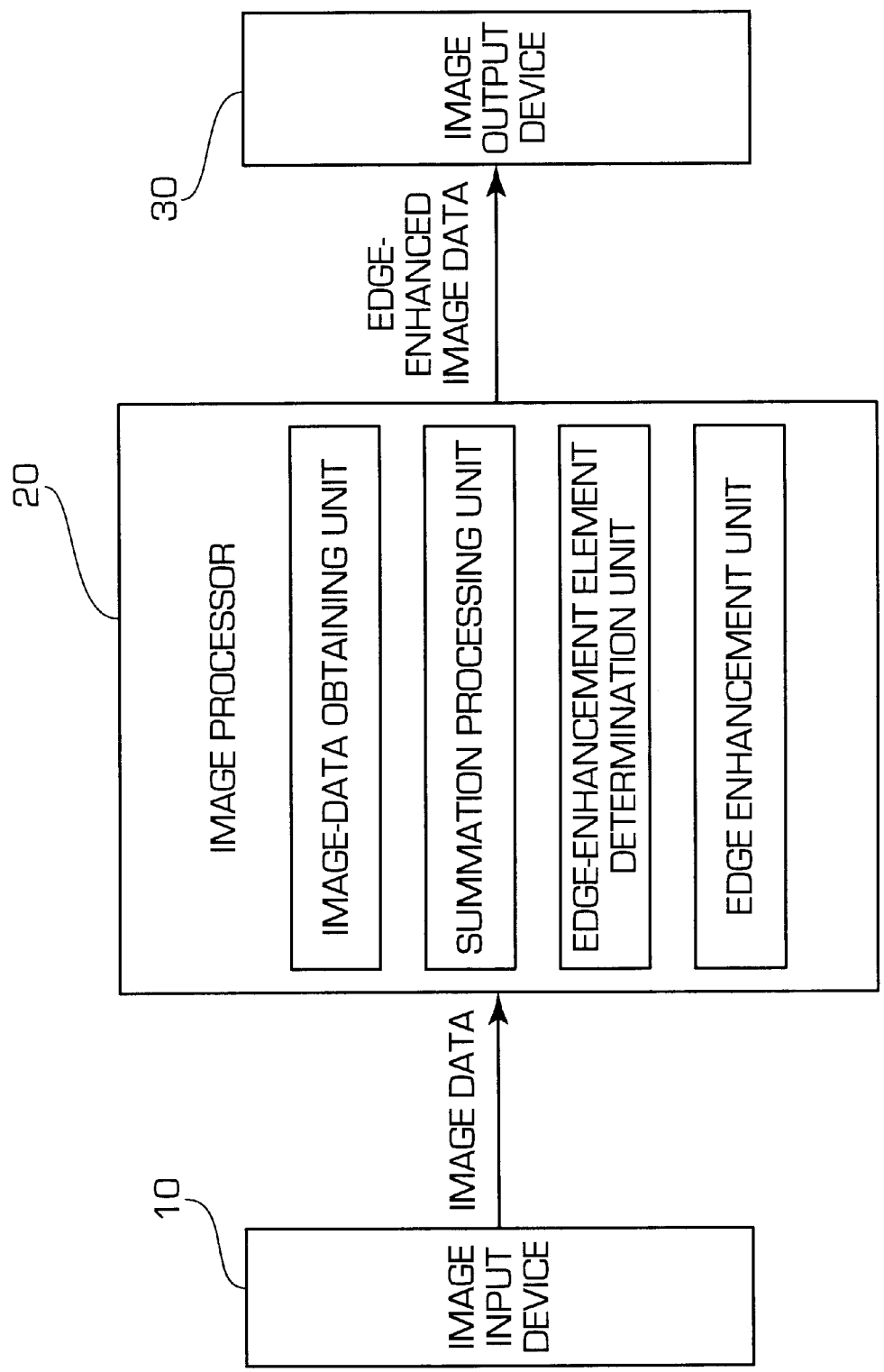
FIG. 1 is a block diagram showing an image processing system to which an edge-enhancement processing apparatus according to an embodiment of the present invention is applied.
Figure 2:
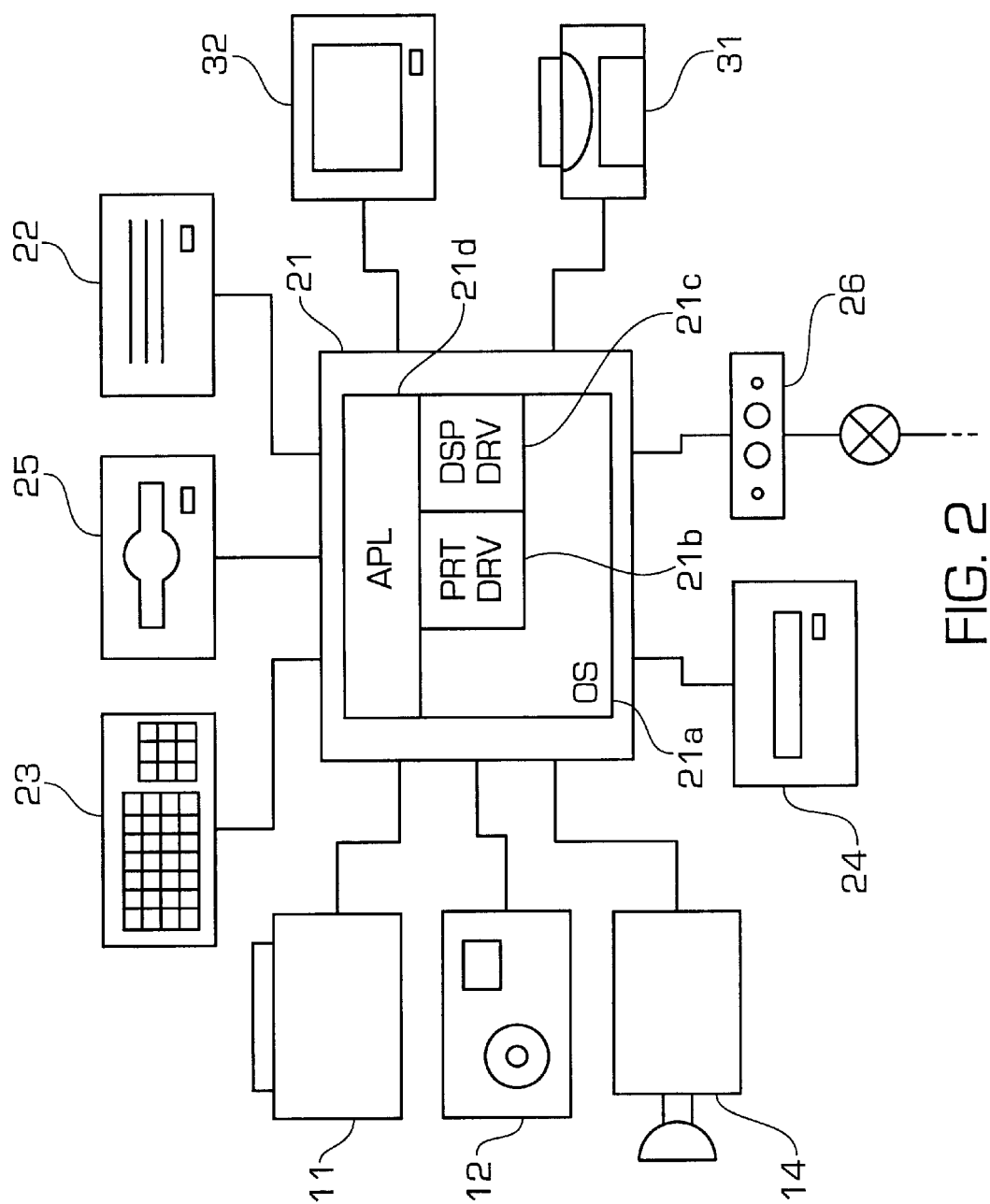
FIG. 2 is a block diagram showing the hardware construction of the edge-enhancement processing apparatus.

FIG. 1 is a block diagram showing an image processing system to which an edge-enhancement processing apparatus according to an embodiment of the present invention is applied. FIG. 2 is a block diagram showing the hardware construction of the edge-enhancement processing apparatus.

In FIG. 1, an image input device 10 outputs image data, representing a photograph or the like with pixels in dot matrix, to an image processor 20. The image processor 20 executes image processing to perform edge enhancement processing at a predetermined enhancement level. The image processor 20 outputs the edge-enhancement processed image data to an image output device 30. The image output device 30 outputs an edge-enhancement processed image represented with pixels in dot matrix. The image data outputted from the image processor 20 is corrected image data having improved sharpness by enhancement on unsharp image edges. The image processor 20 has an image-data obtaining unit which obtains image data from the image input device 10, a summation processing unit which calculates a change level by each pixel based on a luminance level value and sums up change level, an edge-enhancement element determination unit which determines an edge enhancement element based on the result of summation, and an edge enhancement unit which performs enhancement on respective edge pixels based on the determined edge enhancement element and outputs the edge-enhancement processed image data to the image output device 30.

As shown in FIG. 2, the image input device 10 is realized by a scanner 11, a digital still camera 12, a video camera 14 or the like. The image processor 20 is realized by a computer system comprising a computer 21, a hard disk 22, a keyboard 23, a CD-ROM drive 24, a floppy disk drive 25, a modem 26 and the like. The image output device 30 is realized by a printer 31, a display 32 or the like. In the present embodiment, edge enhancement processing is performed as image processing, the image data preferably represents a natural image such as a photograph. Note that the modem 26 is connected to a public communication line, and connected to an external network via the public communication line for downloading software program and data.

In the present embodiment, the scanner 11 or the digital still camera 12 as the image input device 10 outputs RGB (red, green and blue) multi-level data as image data. The printer 31 as the image output device 30 inputs CMY (cyan, magenta and yellow) multi-level data or CMYK (cyan, magenta, yellow and black) binary data. The display 32 inputs RGB multi-level data. On the other hand, an operating system 21a operates in the computer main body 21, further, a printer driver 21b for the printer 31 and a display driver 21c for the display 32 are installed in the computer main body 21. Further, an image-processing application program 21d executes a predetermined image processing in cooperation with the printer driver 21b and the display driver 21c in accordance with necessity, under the control of the operating system 21a. Accordingly, the computer main body 21 as the image processor 20 inputs RGB multi-level data, performs edge enhancement processing at an optimum enhancement level on the input data, displays the edge-enhancement processed RGB multi-level data on the display 32 via the display driver 21c, and at the same time, converts the data into CMY binary data and print-outputs the converted data by the printer 31 via the printer driver 21b.

Figure 3:
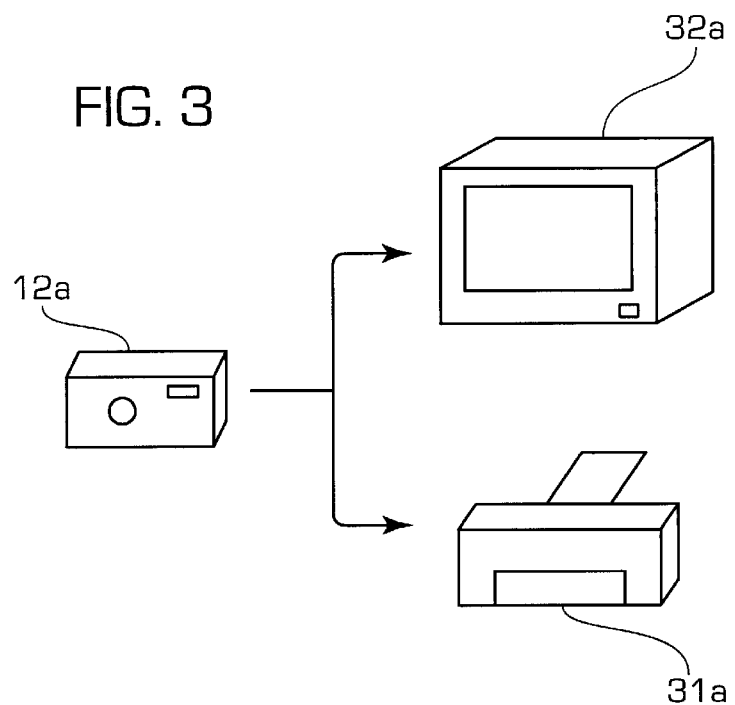
FIG. 3 is a perspective view showing an another example to which the edge-enhancement processing apparatus of the present invention is applied.
Figure 4:
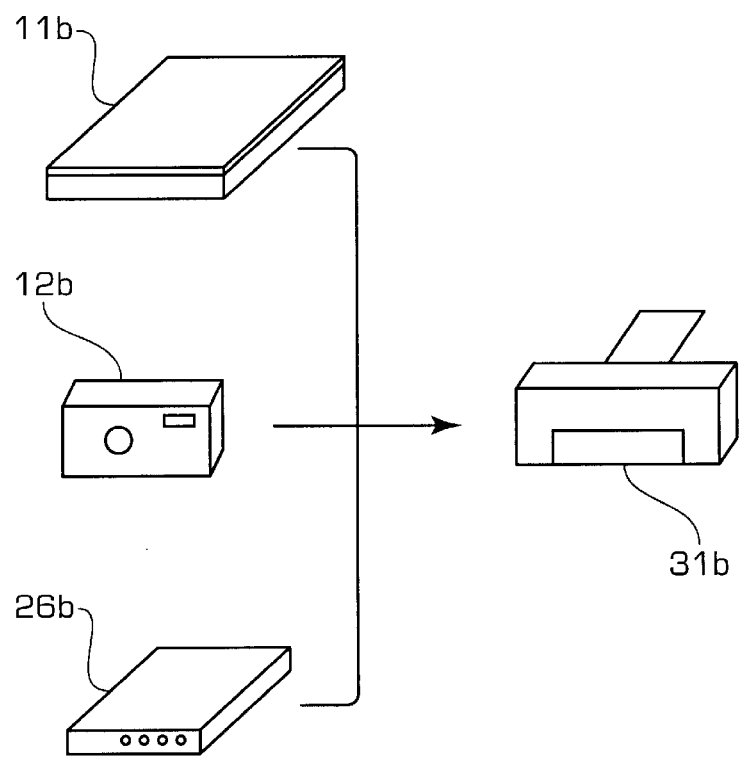
FIG. 4 is a perspective view showing an another example to which the edge-enhancement processing apparatus of the present invention is applied.

In this manner, in the present embodiment, a computer system is provided between image input device and image output device for edge enhancement processing, however, the computer system is not always necessary, but any system which performs edge enhancement processing on image data can be employed. For example, the system may be arranged as shown in FIG. 3, where an image processing device for edge enhancement processing is incorporated in a digital still camera 12a, and converted image data is displayed on a display 32a or print-outputted by a printer 31a. Further, as shown in FIG. 4, it may be arranged such that, a printer 31b inputs image data via a scanner 11b, a digital still camera 12b, a modem 26b or the like without a computer system, and prints an image based on the input image data. In the printer 31b, edge enhancement processing is automatically performed on the input image data.

Figure 5:
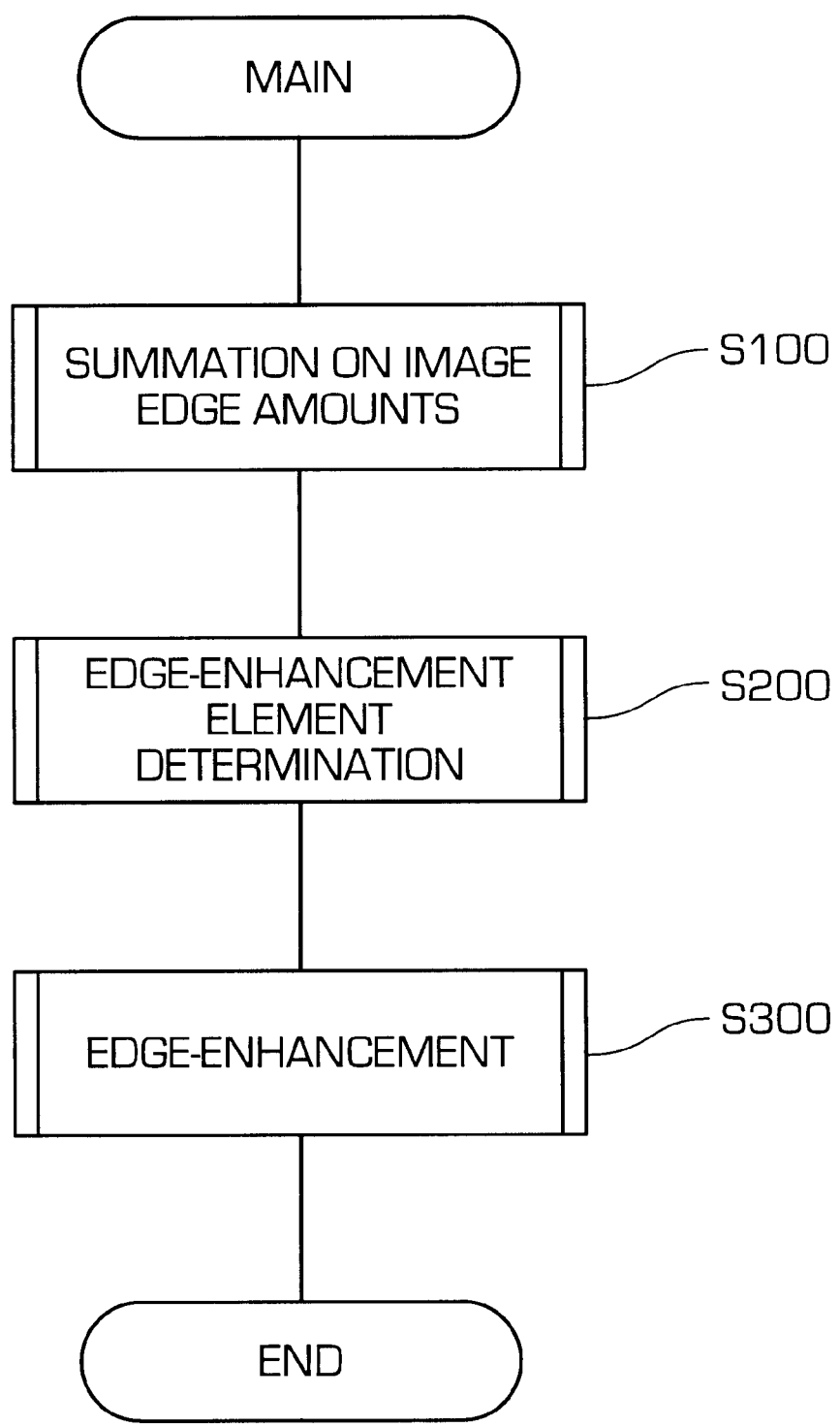
FIG. 5 is a flowchart showing a main routine in the edge-enhancement processing apparatus of the present invention.

The edge enhancement processing is made by the image processing program in the computer main body 21 corresponding to the flowchart as shown in FIG. 5. In the flowchart, at step S100, edge amounts of respective pixels are calculated and summed up for judging the sharpness level of the image, then at step S200, an edge enhancement element is determined based on the result of summation, and at step S300, edge enhancement processing is performed in accordance with the edge enhancement element.

Figure 6:
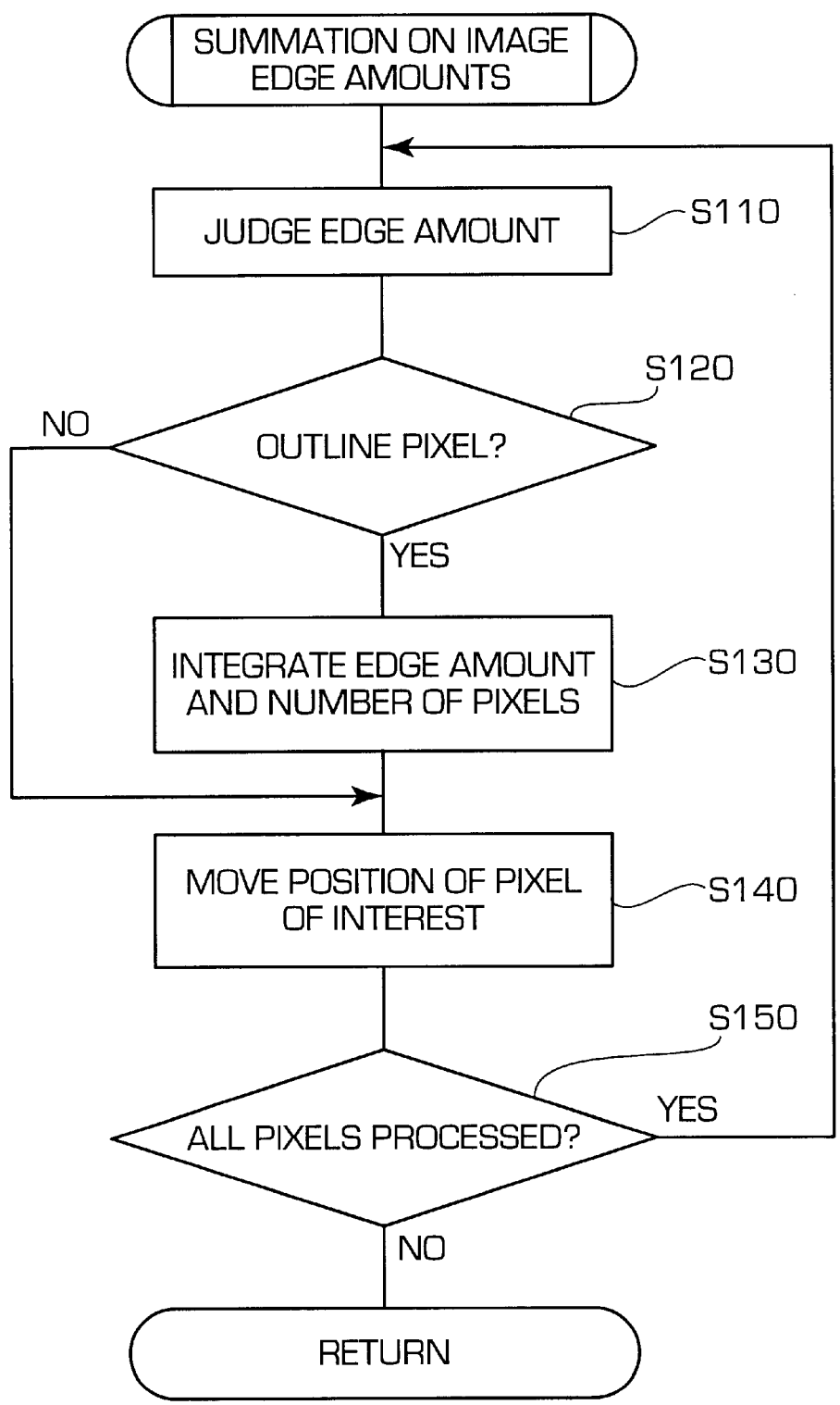
FIG. 6 is a flowchart showing image edge-amount summation processing.

First, at step S100, edge amounts are summed up to judge the sharpness level of the image. The summation processing is shown in more detail in the flowchart of FIG. 6.

Figure 7:
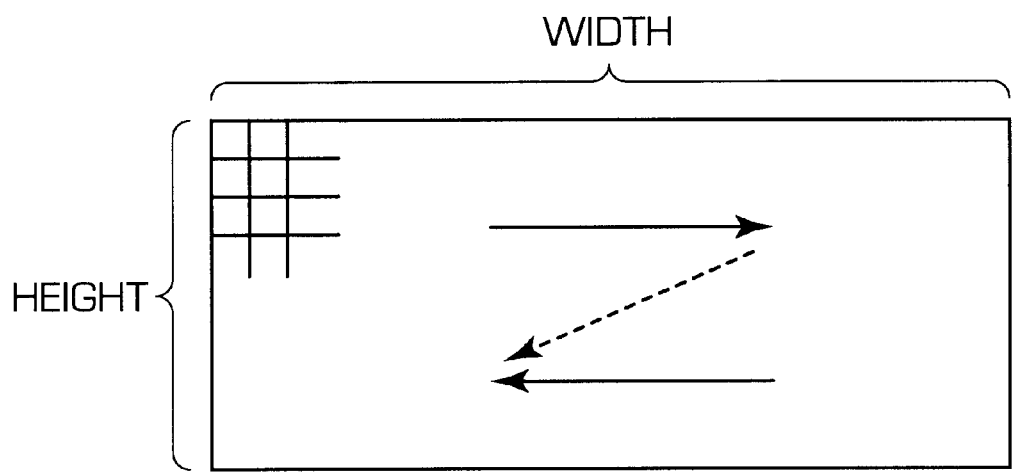
FIG. 7 is an explanatory view showing the size of image data and the position of a pixel of interest moved during the processing.

Assuming that the image data is composed of pixels in dot matrix, each pixels is represented by multi-level RGB luminance data. At an edge portion of the image, the difference of the luminance data between adjacent pixels is large. The difference, which is a luminance gradient, is called an edge amount. As shown in FIG. 7, edge amounts are summed up while scanning the respective pixels constituting the image.

Figure 8:
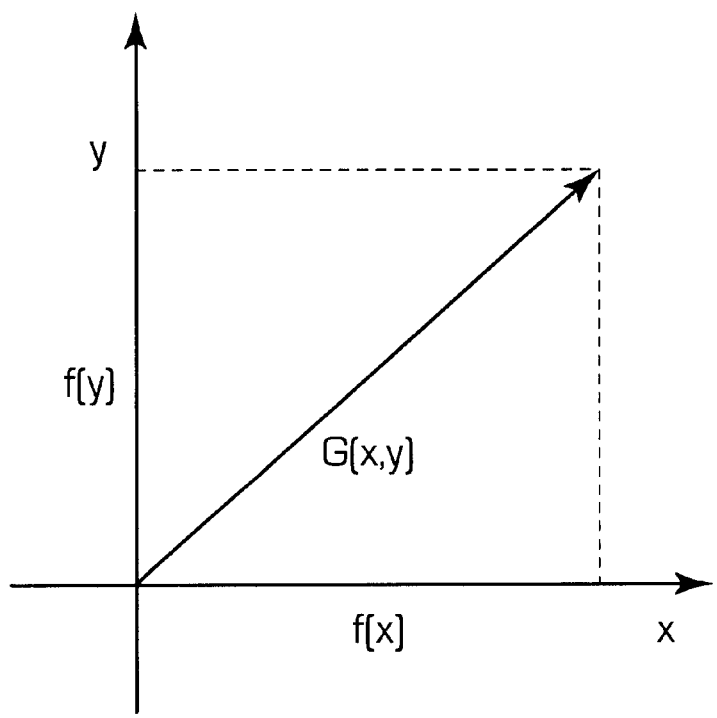
FIG. 8 is a graph showing an image change level represented by respective component values of rectangular coordinates.

At step S110, the edge amount of the each pixel is judged. In case of considering an XY rectangular coordinates as shown in FIG. 8, the vector of a image change level can be calculated by obtaining an X-axis directional component and a Y-axis directional component. In a digital image composed of pixels in dot matrix, the pixels are adjacent to each other in a vertical axial direction and a lateral axial direction as shown in FIG. 9. The brightness of these pixels are represented by f(x,y). In this case, f(x,y) may be R(x,y), G(x,y) and B(x,y) as respective RGB luminances or a total luminance Y(x,y). Note that the relation between the RGB luminances R(x,y), G(x,y) and B(x,y) and the total luminance Y(x,y) cannot be converted without referring to a color conversion table or the like, in the strict sense, however, for the simplification of the processing, the correspondence as represented by the following equation is utilized.

$$Y=0.30R+0.59G+0.11B \tag{1}$$

In FIG. 9, the X-directional difference value fx and the Y-directional difference value fy are represented by:

$$fx=f(x+1,y)-f(x,y) \tag{2}$$

$$fy=f(x,y+1)-f(x,y) \tag{3}$$

Accordingly, a size g(x,y) of the vector having these components is a vector value represented by:

$$|g(x,y)|=(fx^{}2+fy^{}2)^{**}(1/2) \tag{4}$$

The edge amount is represented by this |g(x,y)|. Note that the pixels are arranged into matrix in the vertical and lateral directions as shown in FIG. 10, and when the central pixel is regarded as a pixel of interest, there are eight adjacent pixels. Accordingly, it may be arranged such that the differences between the pixel of interest and the respective adjacent pixels are represented by vectors, and the sum of the vectors is judged as the change level of the image. Note that it can be said that the less the number of pixels to be compared is, the less the amount of calculation is. Further, regarding the adjacent pixels arrayed in at least a linear direction, they interact with each other when the position of a pixel of interest moves. Accordingly, the calculation on these pixels may be omitted. To further reduce the calculation amount, the difference of luminance may be calculated only between adjacent pixels arrayed in the lateral direction. The calculation is made by utilizing the luminance, however, if substitute values for the luminance are used in the calculation, including simple calculation, substantially the same results can be obtained.

Figure 11:
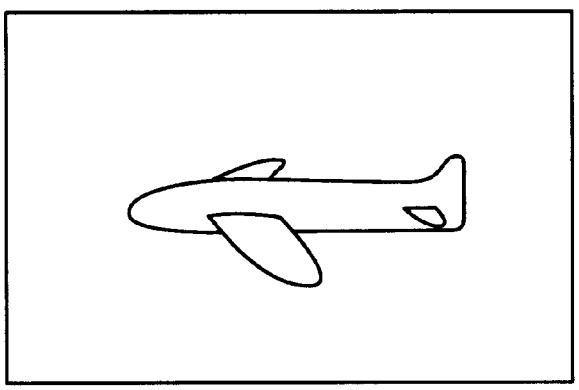
FIG. 11 is an example of image data with a small background.
Figure 12:
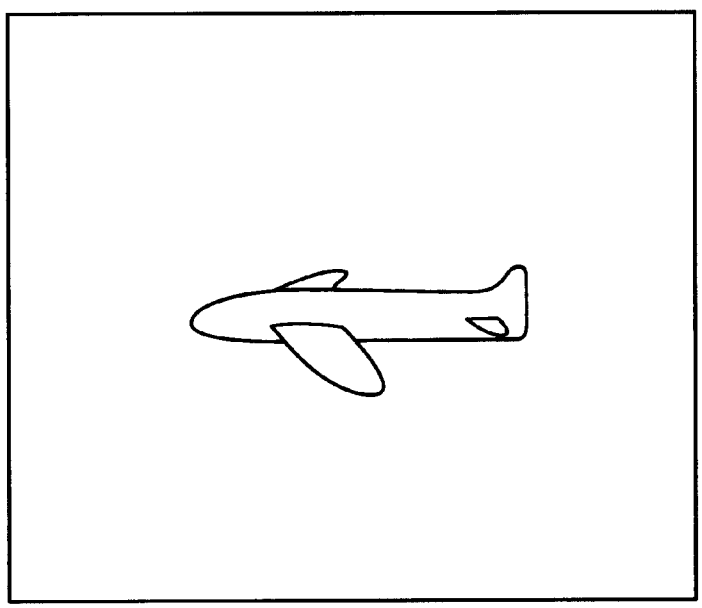
FIG. 12 is an example of image data with a large background.

Even though the edge amount of each pixel is obtained as described above, the sharpness level of the image cannot be obtained only by obtaining the edge amounts of all the pixels and averaging the obtained edge amounts. FIGS. 11 and 12 show pictures of airplanes in flight. Apparently, in these figures, the sky portions as the backgrounds of the images do not have a great image change level. However, assuming that the airplanes as the subjects have the same sharpness level, if image sharpness level is respectively obtained by averaging edge amounts of all the pixels, the sharpness level of the image in FIG. 12, having the airplane of the same sharpness level as that of the airplane in FIG. 11 but including a greater background than that in FIG. 11, is lower than that of the image in FIG. 11. Accordingly, averaging is not appropriate in obtaining image sharpness level.

Figure 13:
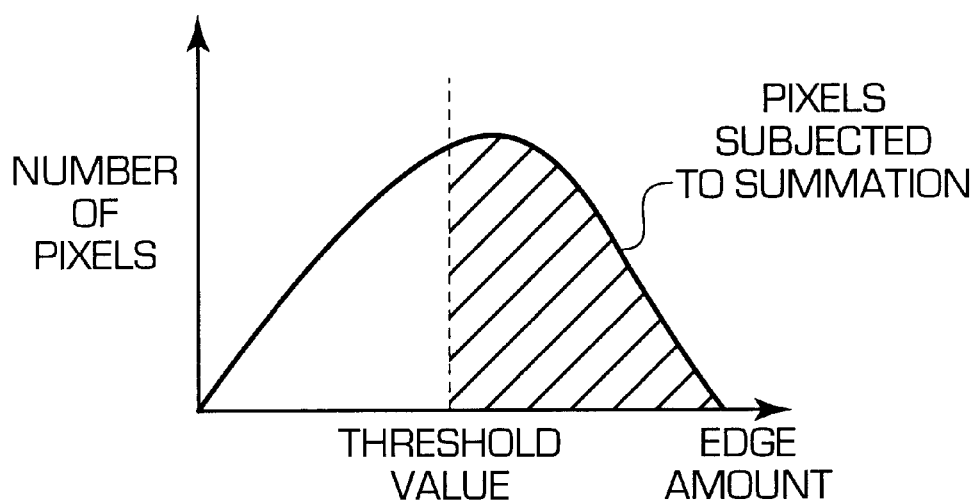
FIG. 13 is a graph showing pixels to be subjected to summation as outline pixels.
Figure 16:
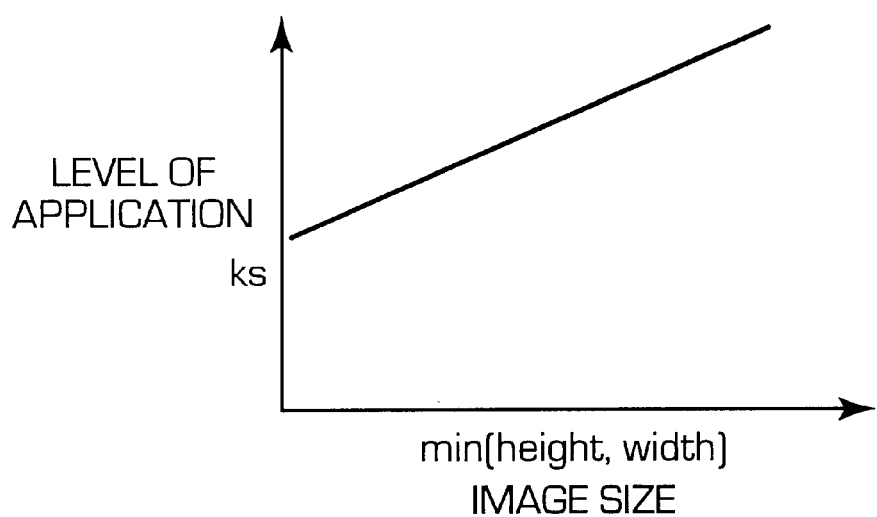
FIG. 16 is a graph showing the relation between an image size and an applicable level.

In consideration of this situation, in the present embodiment, the mean value of the edge amounts of all the pixels is not obtained, but the mean value of only edge amounts of outline portions is obtained so as to judge how sharp the outline portions is in the image. FIG. 13 shows a histogram in a case where edge amounts are summed up with respect to all the pixels, indicating that only pixels having edge amounts over a threshold value are subjected to the summation. More specifically, at step S120, the edge amount is compared with a predetermined threshold value to determine whether or not the pixel belongs to an outline portion. Only if the pixel belongs to an outline portion, the process proceeds to step S130, in which the edge amount is integrated, and the number of pixels in the outline portions is integrated.

To perform the pixel-based judgment on all the pixels, at step S140, the position of pixel of interest is moved as shown in FIG. 7, and the processing is repeated until it is determined at step S150 that the judgment on all the pixels has been completed.

Figure 14:
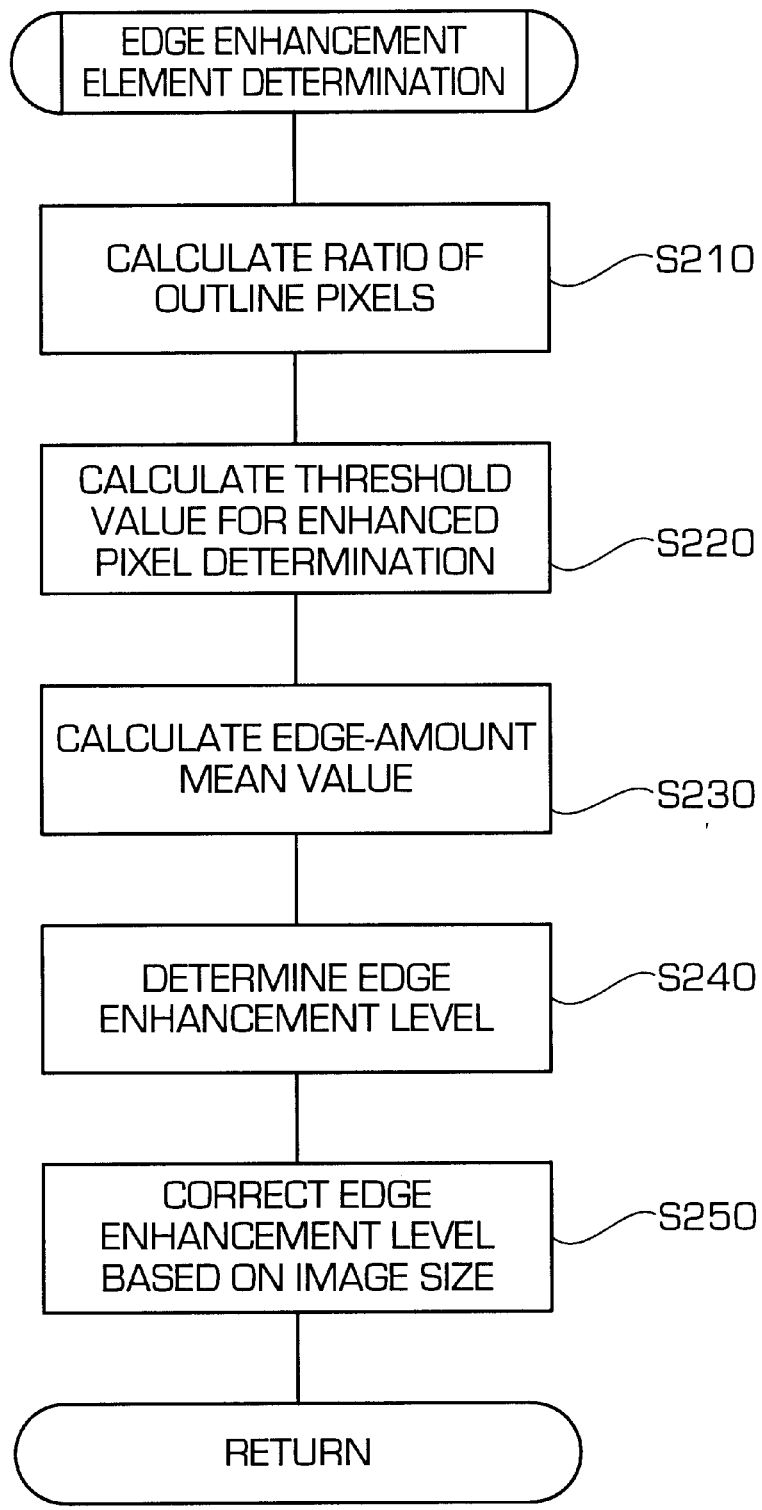
FIG. 14 is a flowchart showing edge-enhancement element determination processing.

When the edge amounts have been summed up as above, edge-enhancement element determination is performed at step S200. The edge-enhancement element determination is shown in more detail in the flowchart of FIG. 14.

First, at step S 210, the ratio of edge pixels is calculated. As the number of outline pixels (edge_pixel) has been integrated at step S 130, the ratio of the number of outline pixels (edge_rate) with respect to the number of all the pixels (total_pixel) is calculated:

edge_rate=edge_pixel/total_pixel

As the ratio (edge_rate) is closer to "1", the image has more edge pixels. The sharpness level of the airplane in the image in FIG. 11 and that in FIG. 12 are the same, however, the number of background pixels in the image in FIG. 11 and that in FIG. 12 are different. The background image of the greater number of pixels is rather blurred, but it is not necessarily sharp. That is, it is preferable to avoid performing edge enhancement processing on the background pixels. Such background includes a gradation portion of blue sky, a skin portion of a portrait and the like.

In the present embodiment, a threshold value ST, used for determining pixels to be subjected to edge enhancement processing, is obtained by utilizing the above ratio, as follows:

ST=K/edge_rate

Figure 15A:
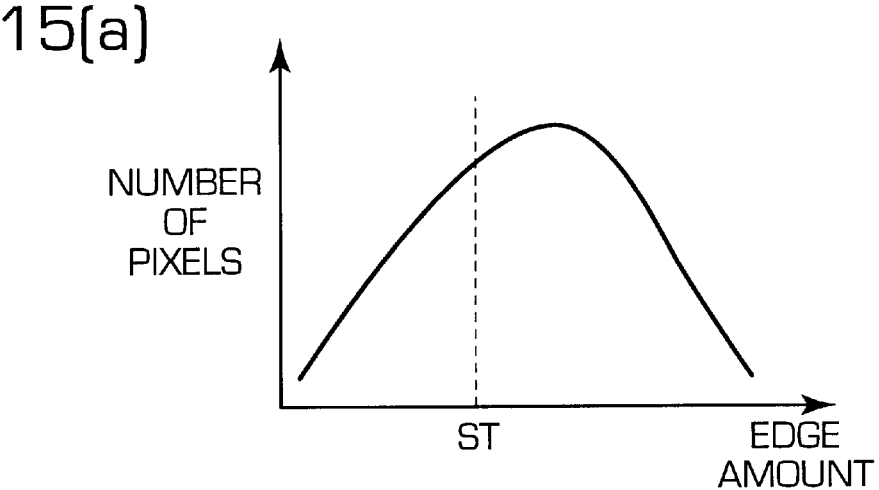
FIGS. 15(a)–15(c) are graphs showing the relation between edge amount distribution and a threshold value.
Figure 15B:
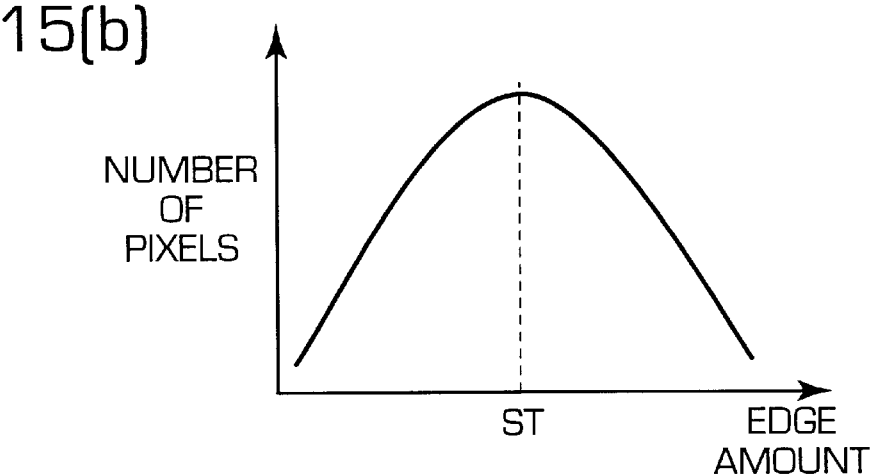
Figure 15C:
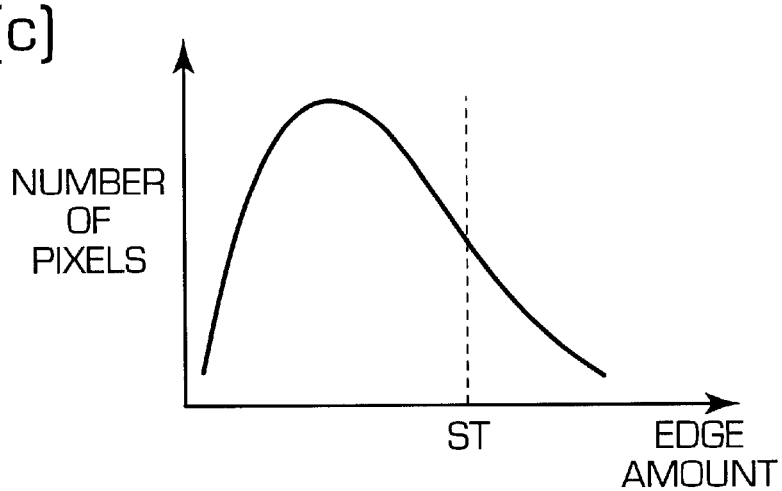

Note that "K" is a constant. FIGS. 15(a) to 15(c) show the relation between the edge amount distribution and the threshold value ST. In FIG. 15(a), the total edge amount is large. As it is determined that the number of outline pixels is large, a threshold value ST0 is low. In FIG. 15(c), the total edge amount is small, therefore, a threshold value ST2 is high. FIG. 15(b) shows an intermediate threshold value ST1 between those in FIGS. 15(a) and 15(c). That is, when the number of sharp pixels is small, the threshold value ST is set to a high value, so that more pixels are judged as non-edge pixels in determination of non-edge pixel. This avoids enhancement on noise in a skin portion or the like.

Next, at step S230, the integrated edge amount is divided by the number of pixels in the outline portions, to obtain only the mean value of the edge amounts in the outline portions. That is, the sharpness level SL of this image is calculated by:

$$SL = \sum_{x,y} |g(x, y)| / E(I)pix \quad (5)$$

E(I)pix: the number of outline pixels

In this case, the sharpness level of an image having a low SL value is determined as low (apparently blurred), while the sharpness level of an image having a high SL value is determined as high (apparently clear).

On the other hand, as image sharpness is sensuous, the sharpness level SL is obtained in a similar manner from image data of an experimentally-obtained optimum sharpness level, then the obtained sharpness level SL is set as an ideal sharpness level SLopt, and an edge enhancement level Eenhance is obtained by:

$$\text{Eenhance} = KS \cdot (SLopt - SL)^{**}(1/2) \quad (6)$$

In equation (6), the coefficient KS changes in accordance with image size. As shown in FIG. 7, if the image data is composed of "height" dots in the vertical direction and "width" dots in the lateral direction, the coefficient KS is obtained by:

$$KS = \min(\text{height}, \text{width})/A \quad (7)$$

In equation (7), "min (height, width)" indicates "height" dots or "width" dots as a smaller number of dots. "A" is a constant having a value "768". They have been experimentally obtained and may be appropriately changed. Basically, excellent results have been obtained by increasing the enhancement level as the image size becomes greater.

Figure 17:
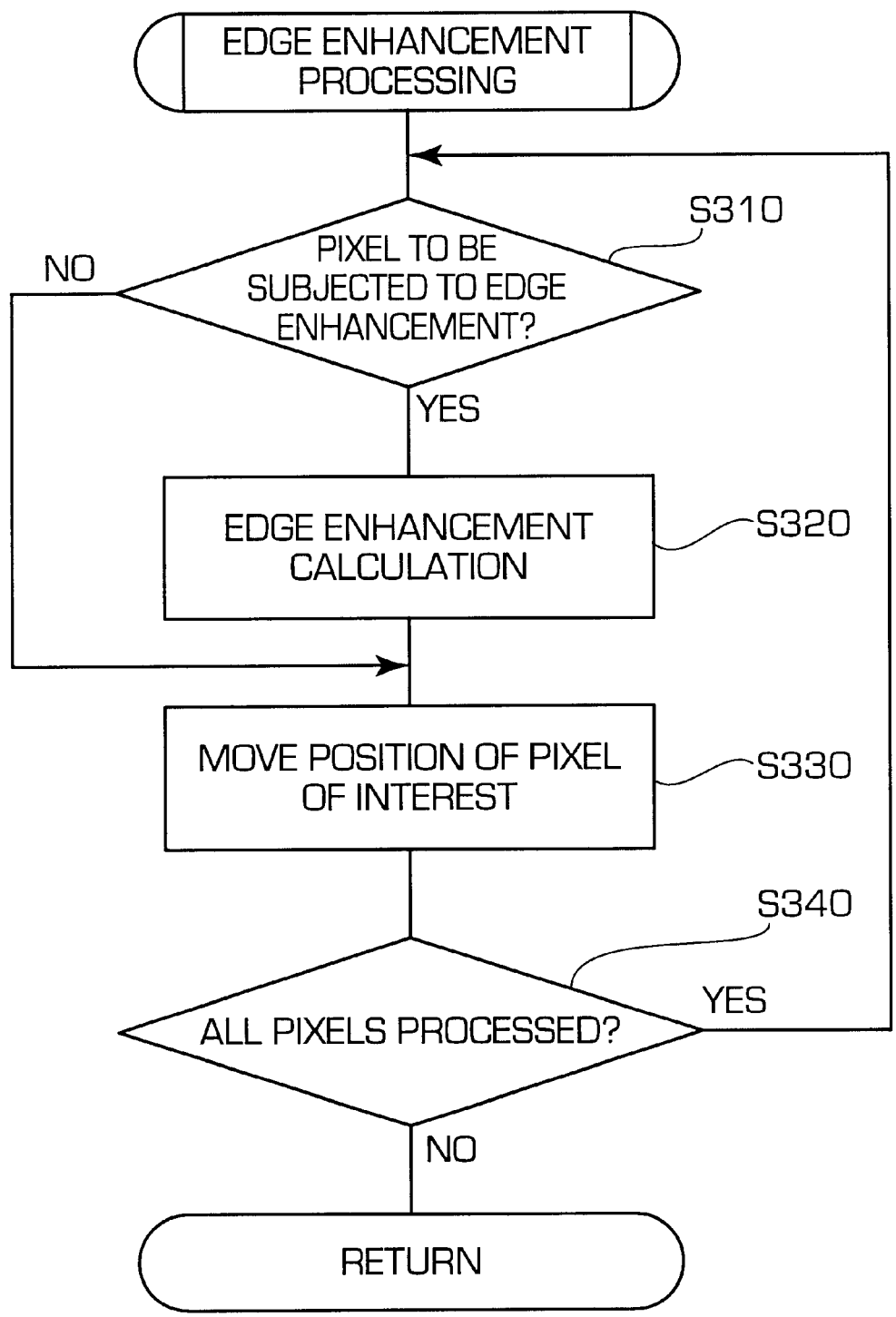
FIG. 17 is a flowchart showing edge enhancement processing.

When the edge enhancement level Eenhance and the threshold value ST have been obtained as described above, edge enhancement processing is performed on all the pixels at step S300. The edge enhancement processing is shown in more detail in the flowchart of FIG. 17. In this case, the pixel of interest is determined in advance, and as shown in FIG. 7, the position of the pixel of interest is moved to scan all the pixels. Note that at step S310, the above-described threshold value ST and the edge amount of each pixel are compared to determine whether or not the pixel is to be subjected to edge enhancement processing. If the edge amount is greater than the threshold value ST, it is determined that the pixel is to be subjected to edge enhancement processing, and at step S320, edge enhancement processing is performed on the pixel.

Step S320 is edge enhancement processing calculation. With respect to the luminance Y of each pixel before it is edge-enhanced, a luminance Y' of the edge-enhanced pixel is calculated by:

$$Y' = Y + \text{Eenhance} \cdot (Y - Y\text{unsharp}) \quad (8)$$

In equation (8), "Yunsharp" indicates image data of each pixel which has been unsharp-mask processed. Next, the unsharp mask processing will be described. FIGS. 18 to 20 show unsharp masks 40 (41 to 43) of three different sizes. The unsharp mask 40 is utilized for integration on matrix image data, such that the central value "100" is used as a weight for the pixel of interest Y(x,y), and values of the unsharp mask corresponding to the peripheral pixels are used as weights for the peripheral pixels. If the unsharp mask 42 in FIG. 19 is used, the integration is made in accordance with:

$$Yunsharp(x, y) = (1/632) \sum_{ij} (Mij \times Y(x+i, y+j)) \quad (9)$$

In equation (9), the value "632" is a sum of weight coefficients. In the different sized unsharp masks 41 to 43, the sum of weight coefficients are respectively "396", "632" and "2516". Further, "Mij" indicates a weight coefficient given in a cell of the unsharp mask; and "Y(x,y)", image data of each pixel. Note that "ij" indicates coordinate values in the row and column directions in the different sized unsharp masks 41 to 43.

In the edge enhancement calculation based on equation (8), "Yunsharp(x,y)" is weighting with lower weight values with respect to the peripheral pixels than that with respect to the pixel of interest. As a result, so-called "blurred (unsharp)" image data is obtained. The blurred image data is similar to image data passed through a so-called low-pass filter. Accordingly, "Y(x,y)-Yunsharp(x,y)" means subtraction of a low frequency component from the initial entire component, i.e., "Y(x,y)-Yunsharp(x,y)" obtains image data similar to high-pass filtered image data. Then, the high-pass filtered high frequency component is multiplied by the edge enhancement level Eenhance, and the multiplied result is added to "Y(x,y)". This increases the high frequency component in proportion to the edge enhancement level Eenhance, as a result, the edge is enhanced.

On the other hand, the edge enhancement level also changes dependent on the size of the unsharp mask. In the three unsharp masks 41 to 43 having different numbers of rows and columns, as the mask is greater, the weighting with respect to the peripheral pixels around a pixel of interest is greater, while the weighting gradually decreases toward distant pixels. In other words, as the mask is greater, the weighting characteristic as a low-pass filter increases, and the generation of high frequency component can be made more easily in accordance with equation (8).

Accordingly, if the edge enhancement level Eenhance is high, the large unsharp mask 43 is used, while if the edge enhancement level Eenhance is low, the small unsharp mask 41 is used. In case of an intermediate number of pixels, the middle sized unsharp mask 42 is used.

As it is apparent from these figures, the unsharp mask 40 has the greatest weight coefficient at its central portion, and gradually-decreasing weighting values toward its ends. The variation of the weighting is not necessarily fixedly determined but may be appropriately changed. The mask is not necessarily an "unsharp mask", and its size is not limited to those shown in the figures. It may be composed of 6×6 cells or 8×8 cells.

Note that in the calculation in equation (9), multiplications and additions are required for the number of cells in the unsharp mask 40, with respect to the pixels around the pixel of interest, and the processing amount is large, accordingly, the unsharp mask is arranged so as to reduce the processing amount. In a case where the unsharp mask 40 of an appropriate size is employed, calculation is not necessarily required for all the cells. In the unsharp mask 42 having 7×7 cells in FIG. 19, the weighting with respect to the outmost peripheral cells is "0" or "1". In case of weighting by "0", the multiplication by "0" is meaningless, while in case of weighting by "1", very low weighted results are obtained in comparison with the total cell value "632".

In view of this situation, in the present embodiment, calculation is not performed with respect to all the cells of the 7×7-cell unsharp mask 42, but an unsharp mask 44 having 5×5 cells within a double-line block in the unsharp mask 42 is used. By using the unsharp mask 44, the outmost peripheral portion of the 7×7-cell unsharp mask 42 is omitted. Similarly, the outmost peripheral portion of the 13×13-cell unsharp mask 43 may be omitted. The 7×7-cell unsharp mask 42 has 48 (=7×7−1) pixels around a pixel of interest, and multiplication and addition for these pixels are required. However, in use of the 5×5-cell unsharp mask 44 which substantially obtains the same calculation result, calculation is performed 24 (=5×5−1) times, i.e., the calculation amount is reduced to the half of that in case of the unsharp mask 42; in case of the 13×13-cell unsharp mask 43, the calculation amount is reduced from 168 (=13×13−1) times to 120 (=11×11 −1) times.

Further, since edge enhancement is required in so-called image edge portions, the processing is limited to portions where image data greatly changes between adjacent pixels. In consideration of this situation, it may be arranged such that the calculation is performed when there is a large difference of image data between adjacent pixels. This unnecessitates the calculation with an unsharp mask at almost all image data portions which are not image edges, thus greatly reduces processing.

Note that the luminance Y has been described as the luminance of each pixel, for the sake of assistance of understanding, however, each pixel actually has RGB multi-level data, and the luminance Y is converted by simple weighting on the RGB multi-level data as shown in equation (1).

From the edge-enhanced luminance Y' and the unenhanced luminance Y, substitution is made as:

$$delta = Y - Y' \quad (10)$$

Then it is possible to calculate converted R'G'B' from equation (10):

$$R' = R + delta$$
$$G' = G + delta$$
$$B' = B + delta \quad (11)$$

In this calculation, the multiplication and addition become ⅓, thus the entire processing time can be reduced by 50% to 70%. Further, the converted result shows no enhanced color noise and provides improved image quality. Note that the luminance Y is not necessarily obtained with strict weighting as in equation (1). For example, the following equation (12) using a simple mean value does not produce a very large error.

$$Y = (R + G + B)/3 \quad (12)$$

For more simplification, it may be arranged such that in equation (1), only the G component having the greatest contributing value to the luminance Y is regarded as the luminance Y. This does not always cause a large error.

As described above, steps S110 to S150, to sum up edge amounts so as to judge the sharpness level of the image, correspond to the summation process unit; steps S210 to S250, to set a threshold value to determine edge enhancement level and to determine a pixel to be edge-enhanced, correspond to the edge-enhancement element determination unit; and steps S310 to S340, to perform edge enhancement calculation on pixels to be subjected to edge enhancement processing, correspond to the edge enhancement unit. Further, the processing by a hardware device and a software program to obtain image data handled in the edge enhancement processing correspond to the image-data obtaining unit.

Figure 21:
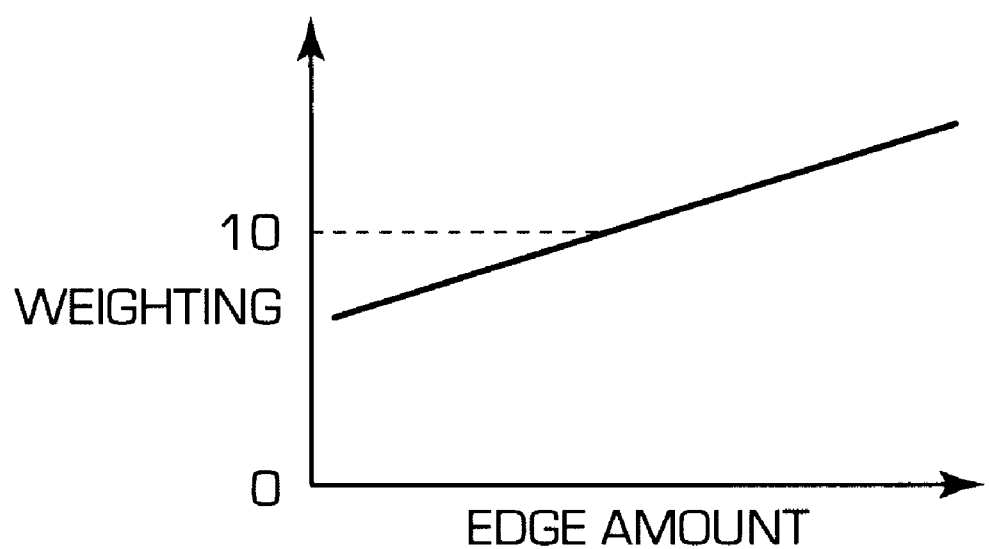
FIG. 21 is a table showing the relation between an edge amount and a weight upon integration with weighting.

On the other hand, in the above description, whether or not edge amounts are summed up is determined based on whether or not each pixel is an outline pixel, however, this determination is used in only one example where summation is performed with respect to pixels having large edge amounts. The sharpness level of the entire image may be judged by so-called weighting with attention to pixels having large edge amounts. In the above-described example, only if it is determined at step S120 that the pixel is an outline pixel, the edge amount is integrated, and the number of pixels is incremented at step S130, however, as shown in FIG. 21, the summation may be performed with respect to all the pixels such that as the edge amount increases, the weight increases. The edge amount is divided by the number of pixels as a result of integration with weighting, thus obtaining a result where pixels having small edge amounts are processed with a low attention level while pixels having large edge amounts are processed with a high attention level.

The method for actual weighting in this case may be appropriately changed. Further, it may be arranged such that the number of outline pixels are summed up based on whether or not each pixel is outline pixel while adding attention to pixels having large edge amounts.

Next, the operation of the present embodiment having the above construction will be described in order.

The description will be made on the assumption that the scanner 11 reads a photographic image, and the printer 31 print-outputs the read image. First, the image-processing application program 21d is activated when the operating system 21a is operating in the computer main body 21, to cause the scanner 11 to read the photograph. The read image data is read by the application program 21d via the operating system 21a, then a pixel of interest is set, and at step S110, the edge amount is determined based on equations (2) to (4). At step S120, it is determined whether or not the pixel of interest resides in an outline portion, based on the edge amount. Only if the pixel is an outline pixel, its edge amount is integrated and the number of pixels in the outline portions is incremented.

At step S140, the above processing is repeated while the position of the pixel of interest is moved, until it is determined at step S150 that the processing on all the pixels has been performed. When all the pixels have been processed, the ratio of the number of outline pixels is calculated at step S210, and the threshold value used for judgment of edge-enhanced pixel is calculated at step S220. At step S230, the mean value of edge amounts of the outline pixels is calculated from the integrated edge amount and the number of pixels, and at step S240, the edge enhancement level Eenhance is calculated from equations (6) and (7), based on the image size according to the image data.

Next, at steps S310 to S340, actual edge enhancement processing is performed on each pixel while the position of the pixel of interest is moved similarly to the above processing. In this case, as described above, one of the unsharp masks 41 to 43 may be selected in accordance with the edge enhancement level Eenhance. Further, the processing speed can be improved by omitting calculation based on various calculation reducing methods.

Thereafter, the edge-enhanced image data is displayed on the display 32 via the display driver 21c. If the displayed image is excellent, the image is printed by the printer 31 via the printer driver 21b. That is, the printer driver 21b inputs the edge-enhanced RGB multi-level data, performs rasterization corresponding to a print head area of the printer 31 via a predetermined resolution conversion, converts the rasterized RGB data to CMYK data, then, converts the CMYK multi-level data to binary data, and outputs the data to the printer 31.

By the above processing, the image data of the photograph read via the scanner 11 is automatically subjected to optimum edge enhancement processing, then displayed on the display 32, and print-outputted by the printer 31.

In this manner, the computer main body 21, which functions as the nucleus of edge enhancement processing, generates a vector from the difference value of data between adjacent pixels and obtains an edge amount as a change level at step S110, selects only pixels having large edge amounts at steps S120 and S130, and obtains the mean value at step S230. The computer main body 21 obtains the sharpness level of the image while adding attention to the pixels having large image change levels, then determines the edge enhancement level Eenhance based on the obtained sharpness level of the image. Thus, the computer main body 21 automatically performs edge enhancement processing at an optimum enhancement level.

We claim:

1. An edge-enhancement processing apparatus comprising:

image-data obtaining unit which obtains multi-level image data representing an image with pixels in dot matrix;

summation processing unit which calculates a change level of each pixel based on differences of luminance or substitute values for luminance between the pixel and peripheral pixels, as a vector value, and sums up said vector values of pixels having large vector values;

edge-enhancement element determination unit which determines an edge enhancement element while judging a sharpness level of the image based on the result of summation; and edge-enhancement unit which performs edge enhancement processing on respective edge pixels based on the determined edge enhancement element.

2. The edge-enhancement processing apparatus according to claim 1, wherein when the summation processing unit calculates a change level of each pixel based on differences of luminance or substitute values for luminance between the pixel and peripheral pixels, as a vector value, employs the differences of luminance or substitute values for luminance among a plurality of pixels which are not arrayed in a linear direction.

3. The edge-enhancement processing apparatus according to claim 1, wherein said summation processing unit performs the summation such that as the vector values increases, a weight increases.

4. The edge-enhancement processing apparatus according to claim 1, wherein said summation processing unit performs summation on outline pixels having the large vector values.

5. The edge-enhancement processing apparatus according to claim 1, wherein said edge-enhancement element determination unit determines an enhanced-pixel selection condition so as to perform edge enhancement processing only on pixels having vector values higher than a predetermined threshold value, based on the result of summation.

6. The edge-enhancement processing apparatus according to claim 5, wherein said edge-enhancement element determination unit determines the threshold value based on the ratio of the pixels having the large vector values.

7. The edge-enhancement processing apparatus according to claim 1, wherein said edge-enhancement element determination unit detects an image size of the image, and determines the edge enhancement element such that as the image size increases, the edge enhancement level increases.

8. The edge-enhancement processing apparatus according to claim 1, wherein said edge enhancement unit has unsharp masks of different sizes, and selects one of the unsharp masks in correspondence with different edge enhancement levels.

9. An edge-enhancement processing method for performing edge enhancement processing on multi-level image data representing an image with pixels in dot matrix, comprising:

a step of calculating a change level of each pixel based on differences of luminance or substitute values for luminance between the pixel and peripheral pixels, as a vector value, and sums up said vector values of pixels having large vector values;

a step of determining an edge enhancement element while a judging sharpness level of the image based on the result of summation, while; and a step of performing edge enhancement processing on respective edge pixels based on the determined edge enhancement element.

10. A medium containing an edge-enhancement processing program for performing edge enhancement processing by a computer on multi-level image data representing an image with pixels in dot matrix, said program including:

a step of calculating a change level of each pixel based on differences of luminance or substitute values for luminance between the pixel and peripheral pixels, as a vector value, and sums up said vector values of pixels having large vector values;

a step of determining an edge enhancement element while judging a sharpness level of the image based on the result of summation; and a step of performing edge enhancement processing on respective edge pixels based on the determined edge enhancement element.

11. An edge-enhancement processing apparatus comprising:

image-data obtaining unit which obtains multi-level image data representing an image with pixels in dot matrix;

edge-enhancement level obtaining unit which obtains an edge enhancement level;

edge-enhancement level correction unit which detects an image size of the image data, and corrects the edge enhancement level such that as the image size increases, the edge enhancement level increases; and edge enhancement unit for corrected enhancement level which performs edge enhancement processing on respective edge pixels based on the corrected edge enhancement level.

12. An edge-enhancement processing method for performing edge enhancement processing on multi-level image data representing an image with pixels in dot matrix, comprising:

a step of obtaining multi-level image data representing an image with pixels in dot matrix;

a step of obtaining an edge enhancement level;

a step of detecting an image size of the image data, and correcting the edge enhancement level such that as the image size increases, the edge-enhancement level increases; and a step of performing edge enhancement processing on respective edge pixels based on the corrected edge enhancement level.

13. A medium containing an edge-enhancement processing program for performing edge enhancement processing by a computer on multi-level image data representing an image with pixels in dot matrix, said program including:

a step of obtaining multi-level image data representing an image with pixels in dot matrix;

a step of obtaining an edge enhancement level;

a step of detecting an image size of the image data, and correcting the edge enhancement level such that as the image size increases, the edge enhancement level increases; and a step of performing edge enhancement processing on respective edge pixels based on the corrected edge enhancement level.

* * * * *